United States Patent [19]

Lehnert et al.

[11] Patent Number: 5,148,645
[45] Date of Patent: Sep. 22, 1992

[54] USE OF FIBROUS MAT-FACED GYPSUM BOARD IN SHAFT WALL ASSEMBLIES AND IMPROVED FIRE RESISTANT BOARD

[75] Inventors: Charles W. Lehnert; Brian G. Randall, both of Stone Mountain; George F. Fowler, Jr., Norcross; Ray W. Hinkel, Stone Mountain, all of Ga.

[73] Assignee: Georgia-Pacific Corporation, Atlanta, Ga.

[21] Appl. No.: 742,219

[22] Filed: Aug. 6, 1991

Related U.S. Application Data

[63] Continuation of Ser. No. 627,091, Dec. 11, 1990, abandoned, which is a continuation of Ser. No. 257,180, Oct. 13, 1988, abandoned, which is a continuation of Ser. No. 769,583, Aug. 26, 1985, abandoned, which is a continuation-in-part of Ser. No. 583,874, Feb. 27, 1984, Pat. No. 4,647,496.

[51] Int. Cl.$^5$ .................. E04F 13/04; E04F 13/18
[52] U.S. Cl. ............................. 52/443; 52/481; 52/317; 52/416; 156/42; 428/285; 428/920
[58] Field of Search ................... 156/39–42; 52/443, 317, 416, 443, 481; 428/70, 71, 289, 920

[56] References Cited

U.S. PATENT DOCUMENTS

| | | | |
|---|---|---|---|
| 2,526,066 | 10/1950 | Croce | 106/110 |
| 2,681,863 | 6/1954 | Croce et al. | 106/109 |
| 2,744,022 | 5/1956 | Croce et al. | 106/110 |
| 3,185,297 | 5/1965 | Rutledge . | |
| 3,284,980 | 11/1966 | Dinkel | 52/600 |
| 3,391,037 | 7/1968 | McNulty . | |
| 3,616,173 | 10/1971 | Green et al. | 106/109 |
| 3,822,340 | 7/1974 | Eberl et al. | 423/555 |
| 3,839,059 | 10/1974 | Rothfelder et al. | 106/115 |
| 3,935,021 | 1/1976 | Greve et al. | 106/111 |
| 3,944,698 | 3/1976 | Dierks et al. | 156/42 |
| 3,993,822 | 11/1976 | Knauf et al. | 428/285 |
| 4,047,355 | 9/1977 | Knorr | 52/738 |
| 4,148,781 | 4/1979 | Narukawa et al. | 156/39 |
| 4,152,408 | 5/1979 | Winslow | 106/109 |
| 4,195,110 | 3/1980 | Dierks et al. | 428/285 |
| 4,265,979 | 5/1981 | Baehr et al. | 428/171 |
| 4,324,082 | 4/1982 | Rutkowski et al. | 52/481 |
| 4,343,167 | 8/1982 | Greve et al. | 52/232 |
| 4,364,212 | 12/1982 | Pearson et al. | 52/281 |
| 4,378,405 | 3/1983 | Pilgrim | 428/703 X |
| 4,435,936 | 3/1984 | Rutkowski | 52/481 |
| 4,504,533 | 3/1985 | Althenhöfer | 428/703 X |
| 4,564,544 | 1/1986 | Burkard et al. | 428/703 X |
| 4,647,486 | 3/1987 | Ali | 428/70 |
| 4,664,707 | 5/1987 | Wilson et al. . | |
| 4,810,569 | 3/1989 | Lehnert et al. | 156/42 |

FOREIGN PATENT DOCUMENTS

| | | |
|---|---|---|
| 939779 | 7/1976 | Canada . |
| 993779 | 7/1976 | Canada . |
| 1033123 | 6/1958 | Fed. Rep. of Germany . |
| 1509853 | 4/1970 | Fed. Rep. of Germany . |
| 2808723 | 9/1991 | Fed. Rep. of Germany . |
| 2411929 | 8/1979 | France ............... 52/309.12 |
| 80937 | 7/1976 | Japan . |
| 137037 | 11/1976 | Japan . |
| 63755 | 5/1977 | Japan . |
| 48667 | 11/1978 | Japan . |
| 2053874A | 2/1981 | United Kingdom . |

Primary Examiner—James L. Ridgill, Jr.
Attorney, Agent, or Firm—Synnestvedt & Lechner

[57] ABSTRACT

Glass mat-faced gypsum boards having a set core containing gypsum dihydrate and at least a minimum amount of chopped fibers, as well as other optional fire-resistant additives, are provided. The resulting boards obtain superior fire resistance properties over conventional paper-faced boards of like thickness which include a similar amount of chopped glass fibers.

3 Claims, 5 Drawing Sheets

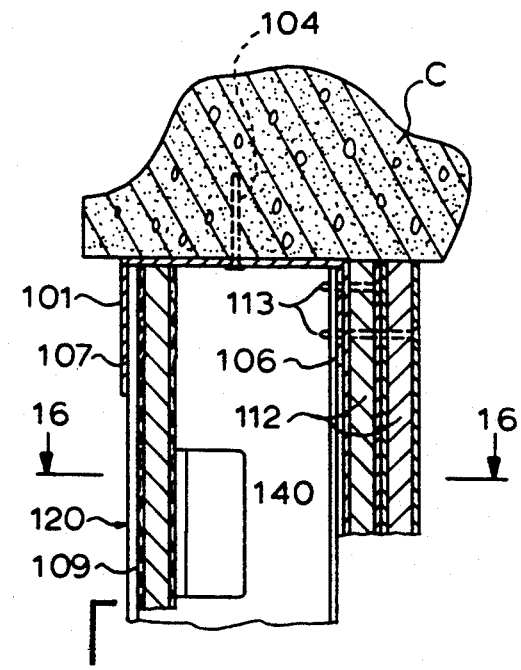
FIG.15
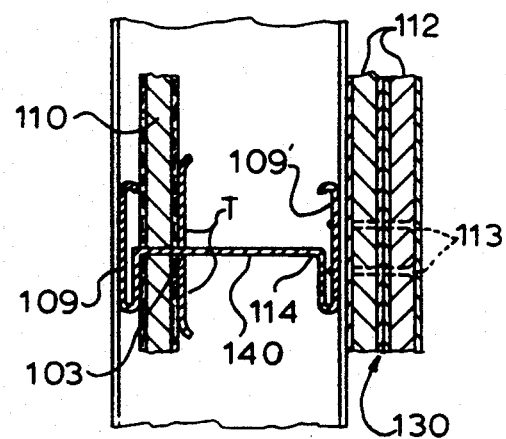
FIG.16
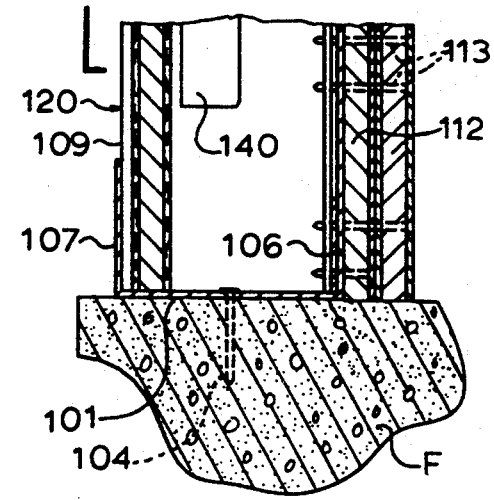

USE OF FIBROUS MAT-FACED GYPSUM BOARD IN SHAFT WALL ASSEMBLIES AND IMPROVED FIRE RESISTANT BOARD

CROSS REFERENCE TO RELATED APPLICATION

This is a continuation of application Ser. No. 627,091, filed Dec. 11, 1990 (now abandoned), which is a continuation of application Ser. No. 257,180, filed Oct. 13, 1988 (now abandoned), which is a continuation of application Ser. No. 769,583, filed Aug. 26, 1985 (now abandoned), which is a continuation-in-part of application Ser. No. 583,874, filed Feb. 27, 1984 (now U.S. Pat. No. 4,647,496), which is a continuation of application Ser. No. 769,583, filed Aug. 26, 1985 (now abandoned), which is a continuation-in-part of application Ser. No. 583,874, filed Feb. 27, 1984 (now U.S. Pat. No. 4,647,496).

FIELD OF THE INVENTION

The invention described in aforementioned application Ser. No. 583,874 (now U.S. Pat. No. 4,647,496) relates to improvements in exterior finishing systems such as, for example, exterior insulation systems for buildings, and also to improvements in shaft wall assemblies for buildings. More particularly, the aforementioned invention relates to an improved structural component for use as a support surface in an exterior finishing system, including an exterior insulation system (sometimes referred to herein for convenience as "EISystem"), and also to the use of said component in hollow shaft wall assemblies, for example, those used in constructing elevator shafts and stairwells. The EISystem and shaft wall assemblies described in said '874 application include as a structural component thereof a fibrous mat-faced gypsum board.

The claims of said '874 application are directed to said improved EISystem, to improved fibrous mat-faced gypsum board which can be used in said system, and to the preparation of said improved board. Although the present application includes a description of said EISystem and of said improved board, the claims hereof are directed to an improved shaft wall assembly including fibrous mat-faced gypsum board as a structural component thereof. In addition, the present application includes a description of and claims to fibrous mat-faced gypsum board having improved fire-resistant properties and to its use in various structural applications, including, for example, a shaft wall assembly.

As disclosed in the aforementioned '874 application, EISystems are presently being used more and more widely to insulate existing buildings and buildings under construction including industrial, commercial, municipal, institutional, and residential buildings. Installation of a typical EISystem in new construction generally involves the following sequential steps: (A) constructing a frame for support of the outside wall of a building; (B) affixing to the frame structural panels to provide a smooth continuous surface for the support of other of the components of the EISystem; (C) affixing to the support panels of insulation; and (D) affixing to the panels of insulation a mesh-like material which in turn is covered with an exterior finishing material having weathering and aesthetic properties. Such systems are designed to be not only highly insulative in character and attractive in appearance, but also weather resistant. EISystems can be used to advantage to conserve energy used for heating and to conserve energy used for air-conditioning.

EISystems have inherent advantages over interior insulating systems and, in addition, they can be used to better advantage than interior insulating systems in many applications.

For example, the range of temperature variation in stuctural components comprising the walls of a building insulated from the outside is less than that for such components in a building which is insulated from the inside. Accordingly, such structural components when insulated from the outside are subjected to significantly lower amounts of stress caused by thermal expansion and contraction than those insulated from the inside. This is particularly advantageous in applications where the structural components comprise materials having markedly different coefficients of expansion, as is often the case. In addition, the interior space in a building having an EISystem tends to have a more uniform temperature and be less drafty than that of a building insulated from the inside.

Certain buildings are not capable of being insulated from the interior except that valuable inside space is lost to the system. The installation of an EISystem does not disturb the inside space of the building.

An EISystem can be used also to modernize or otherwise renovate the exterior of a building in need of renovation. Various of the EISystems which are commercially available give the architect a wide range of aesthetically pleasing designs from which to choose. In addition, the cost of installing an EISystem is relatively low when there is taken into account both the costs of other systems and the improved thermal efficiencies that can be realized. The relatively light weight of both the insulation and the exterior finish in an EISystem is particularly advantageous in new construction because of reduced foundation requirements.

There are, however, problems associated with the design and/or installation of EISystems. As will be discussed in detail below, various of the problems stem from the type of material which is used as the supporting member for the insulating and exterior finishing materials of the system. The present invention involves improvements in such supporting member.

Another type of structural building assembly that is referred to in aforementioned application Serial No. 583,874 is a shaft wall assembly. Such assemblies are used typically to line shafts which commonly extend through a plurality of floors in a building. Examples of such shafts are elevator shafts, air shafts, and stairwells. A popularly used shaft wall assembly is constructed from panels of paper-faced gypsum board which are supported in place by metal framework. The design of the assembly is such that the gypsum board panels, including the panels which line and face the shaft, can be installed from one side, that is, away from the shaft being enclosed. Such assemblies are constructed in place by workmen who are supported by the floor through which the shaft extends. This eliminates the necessity for construction of internal scaffolding or other supports for workmen within the shaft.

It is mandatory that shaft wall assemblies possess certain characteristics for commercial acceptability. For example, it is particularly important that gypsum board used in the shaft wall assemblies possess fire resistant qualities that enable the assemblies utilizing them to meet the strict fire regulations of most municipal codes.

Still further, it should be kept in mind that in an elevator, the gypsum board panels used in lining an elevator shaft must be able to withstand significant forces that are imposed on them by compressed air which is generated by ascending and descending elevator cars. Such forces can involve air pressure loads as high as 15 pounds per square foot. Acoustical insulating characteristics are also desirable in shaft walls.

The present invention relates to improved shaft wall assemblies and also improved fire resistant fibrous mat-faced gypsum board which can be used in such assemblies, as well as in other types of structural applications.

REPORTED DEVELOPMENTS

As mentioned above, a typical EISystem includes a supporting member to which there is affixed insulating material, which in turn is covered with an exterior finishing material. An exemplary EISystem includes a wood or metal frame which is mechanically held in place by nails or screws to appropriate structural members of the building, with panels of the supporting member in turn mechanically affixed by nails or screws to the frame. The supporting member, which typically consists of a smooth continuous surface comprising individual panels of material positioned in abutting relationship, must be strong enough to carry the weight of the components which overlie it, including the insulating and exterior finishing materials. Although low density, light weight insulating panels of expanded polystyrene are used widely in such systems, the exterior finishing material is generally a much denser and heavier weight material, for example, an acrylic resin/cement coating that may include decorative aggregate embedded therein.

Certain of the commercialized EISystems include the use of panels of a Portland cement-based composition as the structural member for the support of the overlying panels of insulation and exterior finishing material. It is believed that such cement-based panels are described in U.S. Pat. No. 3,284,980 which discloses a building panel comprising a core consisting of a mixture of hydraulic cement and light-weight aggregate (for example, perlite) sandwiched between sheets of fibrous material (for example, woven glass fiber screen), which are adhered to the faces of the core by separate layers of bonding material containing at least 50% hydraulic cement. Although the cores of such panels include a light-weight aggregate, the panels are nevertheless relatively heavy. For example, a panel 3'×4' and 7/16" in thickness weighs about 40½ pounds. The handling and installation of such panels lead to the consumption of relatively large amounts of energy. This is a burden to workmen and makes transportation of the panels relatively costly.

A material which is used more widely in EISystems than the aforementioned cement board is gypsum board, that is, panels comprising a core of set gypsum (calcium sulfate dihydrate) sandwiched between paper cover sheets. The particular type of gypsum board that is recommended for use in EISystems is known as "gypsum sheathing" which is gypsum board designed for use on the exterior of buildings where it serves as an underlying surface which is covered with such materials as aluminum, wood siding, Portland cement stucco and, in the case of an EISystem, with insulating and exterior finishing materials. Conventional gypsum wallboard for use in the interior of a building, includes a set gypsum core which contains one or more additives which improve the water resistance of the set core. The gypsum core of commercially available wallboard can absorb as much as 40-50 wt. % water when immersed therein at a temperature of 70° F. for about 2 hours. As the absorption of water tends to substantially reduce the strength of the core, materials which reduce the tendency of the core to absorb water are included therein. In addition, sheathing has water-repellant paper cover sheets which shed water. This is temporary protection for the sheathing before it is installed and before it is covered with the exterior finishing material.

Gypsum sheathing has many desirable characteristics which make it suitable for use in an EISystem. For example, such sheathing has relatively good fire-resistant properties; it is relatively light in weight, it has satisfactory water-resistant properties, and it can be mechanically affixed in convenient fashion to a metal or wooden frame which underlies the sheathing.

Notwithstanding the aforementioned, concerns have been expressed respecting the use of such gypsum sheathing in EISystems. By way of background, it is noted that it is conventional in the industry to affix panels of insulating material to the underlying support of gypsum sheathing by the use of an adhesive material, and in turn, to affix by the use of adhesive materials each of the plies which overlie the panels of insulation. Except for the use of mechanical fastening means in the construction of the frame of the building and in affixing the gypsum sheathing to the frame, all of the components of the EISystem are in effect glued together.

Tests designed to evaluate the cohesive strength of and the adhesive strengths between the various components comprising the EISystem have shown that initial failure (pulling apart) of the system occurs not in any of the adhesive layers, but in the paper cover sheet of the gypsum sheathing. Such cover sheet consists of multiply paper, for example, as many as 7 layers of paper adhered together in a form that appears to the eye to be a monolithic sheet of paper. Accordingly, the cohesive strength of the paper can be characterized as the weak portion of the system.

Another concern respecting the use of gypsum sheathing in EISystems of the aforementioned type is that water leakage through the system can lead to the deterioration of the bond between the paper cover sheet and the gypsum core. (Although the system is designed to be waterproof, there are circumstances where defects in one or more plies of the system and/or unusually severe environmental conditions are the cause of water seepage.) It should be appreciated that deterioration of this bond can lead to cracking of the exterior finish, and possibly even collapse of portions of the system as the component which is adhered to the paper cover sheet pulls apart.

In an effort to overcome the aforementioned type problems, it has been proposed to affix the insulating material to the underlying gypsum sheathing by the use of mechanical fasteners which extend through the insulating material, the core of the gypsum sheathing, and into the frame. This approach to the problem has the disadvantage that the work time involved in installing the system is increased significantly inasmuch as it is much more time consuming to install fasteners than to apply an adhesive. Another shortcoming of the fastener approach is that the fasteners provide paths for the flow of water which may penetrate the system and weaken the bond between the paper cover sheet and gypsum core, as mentioned above.

Irrespective of how the insulating material is affixed to the underlying gypsum sheathing, there is another problem connected with the use of sheathing in EISystems. Because of its susceptibility to degradation by water, care must be taken to protect the sheathing from rain and other moisture conditions which may be encountered as the sheathing is stored at the job site awaiting use and during installation. Taking such protective precautions consumes time, causes inconvenience, and sometimes causes delays in installation of the system—all of which tend to increase costs.

Although gypsum sheathing has a water-repellant paper surface which provides some limited protection against water degradation, this type of surface forms a relatively poor bond with water-based adhesives which are used to adhere to the surface other components of the EISystem.

Accordingly, the invention described and claimed in the aforementioned '874 application is directed to use in EISystems of a support member comprising an improved gypsum-based structural component which is modified in a manner such that problems of the type associated with the use of conventional gypsum sheathing are either overcome or alleviated significantly.

Currently used shaft wall assemblies include also in their structure gypsum board comprising a core of set gypsum sandwiched between paper cover sheets. A shaft wall assembly that is used widely at the present time consists of a metal framework which supports a plurality of plies of panels of gypsum board. Such assemblies are described in detail hereinbelow. In brief, one wall of the assembly, which itself surrounds the open shaft, comprises a pair of horizontally disposed metal J-tracks (one of the pair of tracks being fastened to the ceiling and the other of the pair being fastened to the floor) and a plurality of spaced vertically disposed metal "I-studs" which are frictionally held within the J-tracks. Panels of gypsum board which line the shaft being enclosed are supported by the J-tracks and the I-studs. One or more facing layers of gypsum board panels are fastened to the J-tracks and I-studs on the side of the metal assembly opposite the shaft being enclosed. By increasing the number of facing layers and/or the thickness of the gypsum boards, the fire resistance of the assembly can be improved.

The core of gypsum board used in such commerical shaft wall assemblies usually contain chopped glass fibers as an additive to improve the fire resistant properties of the board. However, to achieve the necessary fire rating for the assembly, such boards have a relatively high density. This adds to shipping costs and makes installation more difficult. In addition, the amount of chopped glass fibers added to the core is not insignificant and adds to the boards' cost. In addition, the paper facing sheets smoke when exposed to the heat of fire and eventually burn.

Gypsum boards suggested for use in shaft wall assemblies, in which the flammable paper facing sheets have been eliminated in favor of glass fiber mat or chopped glass fibers embedded in and covered by set gypsum of the surface layers of the gypsum board are described in U.S. Pat. Nos. 4,195,110 and 4,265,979. It is believed that the boards described in these patents have never been commercially used for a variety of reasons.

The '110 patent discloses a gypsum board formed from set product of a gypsum slurry sandwiched between two surface layers of glass fiber-containing set gypsum composition. The glass fibers may be in the form of rovings, continuous strand mat or chopped glass. The single example of gypsum board which is the subject of the patent shows a board of relatively high density, namely, about 52 lbs./cu. ft. This is about 1 to 2 pounds higher than the conventional paper-faced boards which are referred to in the '110 patent. The patent discloses also that the board which is the subject of the patent has improved flexural strength and does not smoke when exposed to the heat of fire.

The '979 patent discloses a gypsum board that has chopped glass fibers concentrated in the surface portions of the core of the board. In the manufacture of these boards, a mixture of chopped glass fibers and gypsum is hydrated and formed into sheets. Before the sheets set, a "conventional" gypsum slurry is sandwiched between the unset sheets, and the resulting three layered composite is compressed and allowed to dry. The patent also discloses that such boards, in addition to being "highly fire resistant and smoke resistant" and "relatively light", have improved flexural strength over conventional paper faced boards. It is apparent from the disclosure that the patentees contemplate a relatively dense gypsum board, the density of the surface sheet being reported as 81 lbs/cu.ft.

Manufacture of each of the gypsum boards which are the subjects of the aforementioned patents necessitates special handling of the glass-containing surface layers between which the core is sandwiched, foreclosing manufacture of the boards on a conventional gypsum board-making apparatus.

In accordance with the present invention, there are provided an improved shaft wall assembly including a gypsum-based structural component and also gypsum board having improved fire resistant properties.

SUMMARY OF THE INVENTION

In accordance with the invention described and claimed in aforementioned application Ser. No. 583,874, there is provided an improved structural support element comprising a fibrous mat-faced gypsum support surface for use in an exterior finishing system, including exterior insulating systems, for buildings. One embodiment of said invention comprises an exterior insulation system for a building which includes a fibrous mat-faced gypsum support surface facing away from said building, insulating material having an inner surface and an outer surface, the inner surface of which is adhered to said support surface by an adhesive material, the insulating material being substantially free of channels penetrating therethrough and between said inner and outer surfaces, and exterior finishing material overlying the outer surface of said insulating material. The preferred form of fibrous mat for use in said invention is a glass fiber mat in which filaments of glass fiber are bonded together by an adhesive.

Preferably, the fibrous mat-faced gypsum support surface comprises a gypsum core having one or more additives therein which improve the water resistance of the core. As will be seen from examples reported below, a structural member comprising a water-resistant gypsum core faced with glass mat, which itself is hydrophobic, has outstanding weathering characteristics.

An additional preferred form of the invention described and claimed in the '874 application comprises a gypsum board having each of its core faces covered with a porous glass fiber mat, with the mat of one of the faces being adhered to the core by set gypsum penetrating but part-way into the thickness of the mat and having its outer surface substantially free of set gypsum. As will be described below, the glass fiber mat surface, which is free of set gypsum, provides an excellent substrate to which overlying panels of insulation can be adhered.

In one embodiment of the above form of the invention, the outer surface of the mat of the other core face is also substantially free of set gypsum, with set gypsum of the core penetrating but part-way into the thickness of the mat. As will be described below, there are manufacturing advantages which accompany the production of gypsum board of such embodiment.

In another embodiment of the aforementioned form of the invention, the set gypsum of the core penetrates substantially through the thickness of the mat of the other core face over substantial area portions thereof in amounts which are sufficient to coat glass fibers of the mat with a thin film of set gypsum, but not sufficient to form a smooth, continuous coating of set gypsum. This embodiment in which significant portions of the outer surface of the mat have set gypsum thereon provides a protective surface in a two-board package in which the boards are packed together with the gypsum-free surfaces in face-to-face relationship and with the gypsum-covered faces being exposed. More particularly, this preferred form of board comprises a set gypsum core sandwiched between two adhering sheets of porous glass mat of predetermined thickness, each of said mats having an inner and outer surface and comprising randomly distributed glass fibers bonded by an adhesive material, the inner surface of each of said mats being adhered to said gypsum core, and with set gypsum of the core at one surface thereof penetrating substantially through the thickness of one of said mats over substantial area portions thereof and coating substantial area portions of the outer surface thereof and with set gypsum of the core at the other surface thereof penetrating but part-way into the thickness of the other of said mats, the outer surface of the other of said mats being substantially free of set gypsum.

Still another aspect of said invention comprises a process for making the aforementioned embodiments of gypsum board, that is, the embodiment in which both outer surfaces of the mats are substantially free of set gypsum and the embodiment in which the outer surface of one of the mats is substantially free of set gypsum and that of the other mat has set gypsum thereon. The process includes known steps used heretofore in manufacturing in continuous fashion conventional wallboard and known glass-fiber mat-faced gypsum board, but differs therefrom in that the viscosity of the aqueous gypsum slurry from which the board core is made is controlled in a manner such that the slurry penetrates into the mats to the extent needed to achieve the desired result. The basic steps of the process comprise:

(A) forming an aqueous slurry of calcined gypsum;

(B) continuous feeding said aqueous slurry onto an underlying, moving and supported porous fiber glass mat having a predetermined thickness and an outer surface;

(C) forming said deposited slurry as it is, carried on said moving mat into a panel-like shape; and (D) applying to the top surface of said panel-like shape of slurry an overlying porous fiber glass mat of predetermined thickness.

In forming gypsum board in which both of the outer mat surfaces are substantially gypsum-free, the viscosity of the slurry is maintained at a value such that portions of said slurry penetrate but part-way through the thickness of each of said underlying and overlying mats and the panel-like shape of slurry is maintained as the calcined gypsum sets to form a set gypsum core having adhered to its surfaces the underlying and overlying fiber glass mats.

In forming the gypsum-coated/gypsum-free form of glass fiber-faced board, the viscosity of the slurry is maintained at a value such that portions of said slurry penetrate substantially through the thickness of said underlying mat over substantial area portions thereof to coat substantial area portions of the outer surface and at a value such that portions of said slurry penetrate but part-way into the thickness of said overlying mat.

There are numerous advantages which flow from the use of the aforementioned invention. An EISystem which includes a fibrous mat-faced gypsum support surface that has affixed thereto insulating material by adhesive only, that is, without fastening means which extend through the insulating material, can have higher tensile or cohesive strength than a like system which includes conventional paper-faced gypsum board. Testing of some systems of said invention which include insulation in the form of expanded polystyrene panels has shown that initial failure is experienced by a pulling apart of the expanded polystyrene panel, thus evidencing improvement in strength relative to conventional systems where initial failure is experienced in the paper plies of the gypsum support member. The fibrous mat-faced surface of the gypsum support member is water resistant in contrast to conventional paper cover sheets of gypsum board which can soak up water. This improved water resistance gives the applicator greater assurance in selecting adhesives that can be used to adhere insulation directly to the mat-faced surface of the gypsum support element as adverse affects are not encountered by the use of water-based adhesives. The fibrous mat-faced surface of the gypsum support element is "nailable", and accordingly, it can be secured readily to an underlying frame or other substrate by nailing. In comparison to various of the commercially available systems, the improved support surface of said invention has improved strength uniformity in both the length and width dimensions of the system. Unlike conventional paper cover sheets, the fibrous mat does not expand or contract during the manufacture of the product; this reduces cockle and leads to uniformity of dimensions. The preferred embodiment of the invention which includes the use of a water-resistant core provides a substantially improved weather-resistant product which better resists degradation both within and outside of the system.

In accordance with the invention described and claimed in the present application, there is provided a shaft wall assembly comprising fire-resistant framework and, supported by said framework, fibrous mat-faced gypsum board. In preferred form, the assembly comprises glass mat-faced gypsum board, for example, as described herein-above, supported by metal framework. As is described in detail hereinbelow, said glass mat-faced gypsum board preferably comprises a set gypsum core which includes one or more fire-resistant additives, most preferably glass fibers.

Another aspect of the invention described and claimed herein encompasses fibrous mat-faced gypsum board having a core which includes one or more additives which are effective in improving the fire-resistant characteristics of the board. In preferred form, the invention includes glass mat-faced gypsum board having a core which includes glass fibers in a fire-resistant improving amount, for example, about 0.07 to about 0.2 wt. %, based on the dry mixture from which the core is made.

A further aspect of the present invention includes the provision of a glass mat-faced gypsum board which has significantly improved fire-resistant properties notwithstanding the presence in the board core of a relatively small amount of fire-resistant additives such as glass fibers and the use of a core which has a relatively low density.

As will be described hereinbelow, the improved fire-resistant board of the present invention can be used to excellent advantage in shaft wall assemblies, as mentioned above, and, in addition, the board can be used to excellent advantage in the numerous and varied applications in which conventional paper-faced gypsum board is used. Such applications include, for example, the use of the board as structural components of walls, ceilings, partitions, and the like.

The advantages which flow from the provision of the improved fire resistant board of the present invention are numerous and important. For example, the invention affords the manufacture of a gypsum-based product which has fire-resistant properties not heretofore available in gypsum board of popularly used thicknesses and having a relatively low weight. Furthermore, such advantages can be achieved by manufacturing the board of the present invention by the use of existing gypsum-manufacturing equipment.

BRIEF DESCRIPTION OF THE DRAWINGS

FIG. 15 is a diagramatic vertical sectional view taken along line 15—15 through the shaft wall assembly illustrated in FIG. 14; and FIG. 16 is a diagramatic horizontal sectional view taken along line 16—16 through the shaft wall assembly illustrated in FIG. 15.

DETAILED DESCRIPTION OF THE INVENTION

Figure 1:
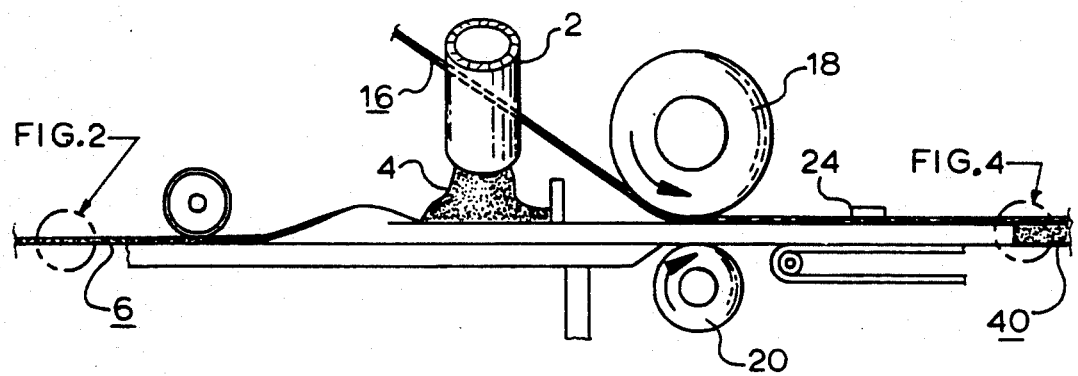
FIG. 1 is a somewhat diagrammatic, fragmentary side elevational view illustrating portions of a manufacturing line for gypsum board of a type suitable for use in the manufacture of gypsum board prepared for use in accordance with the present invention.

The essential components of an EISystem comprise insulating material which is sandwiched between an underlying support surface and an exterior finishing material which can be an integral part of the insulating material, but which is usually applied to the insulating material at the site of installation. From one EISystem to the next, there exist variations in structural details and components. For example, although the exterior finishing material may be affixed directly to the insulating material, various systems include a reinforcing component sandwiched between the exterior finishing material and the insulating material. The reinforcing component comprises generally one or more plies of fiber glass reinforcing fabric or mesh which is adhered by suitable mastic to the surface of the insulating material. In some systems, the support surface is affixed to a wooden frame attached to the exterior surface of the outside wall of a building, whereas in other systems a metal frame is used. In certain applications, the support surface may be affixed directly to the exterior surface of an outside wall, for example, one comprising cinder blocks or concrete blocks. In new construction, the support surface is typically affixed directly to the frame of the building. The adhesive or mastic for adhering together components of the system tends to vary from one system to the next, and typically comprises specially formulated proprietary compositions. The improved support surface of the present invention can be used satisfactorily and to good advantage in EISystems which include overlying plies of insulating and exterior finishing materials, and other optional components.

Presently, the most popularly used insulating material in EISystems is expanded or foamed polystyrene, a material which has good moisture resistant properties. Although it has desirably low water vapor transmission, it is not a vapor barrier, but instead is capable of breathing. Rigid panels of expanded polystyrene are used most widely in EISystems. Such panels have satisfactory compressive strength and resilience and are presently available in thicknesses ranging from ¼ to 6 inches, widths from 6 to 48 inches and lengths ranging from 4 feet to 16 feet. One commercially available system utilizes rigid, expanded polystyrene panels which are 2'×4'×1".

Other thermal insulating materials can be used in EISystems also. Examples of such materials include extruded polystyrene, polyurethane, isocyanurate, cement-based insulating plasters, and phenolic foam. Insulating materials generally have low thermal conduct and low density.

As mentioned above, various EISystems include a reinforcing component, for example, in cloth form, sandwiched between the insulating material and the exterior finishing material. Glass cloth is most widely used at the present time to reinforce the system, that is, to improve the impact strength of the system. The particular type or types of glass cloth used and the number of plies thereof which are used depend on the impact resistance which is desired. Examples of reinforcing cloth or fabric which can be used in the system are woven glass, glass fiber skrim and glass fiber mesh. Installation of the reinforcing fabric generally involves applying a suitable adhesive to the surface of the insulating material and then applying the fabric thereto. Additional plies of fabric can be applied if desired. A cement-/acrylic resin is an example of an adhesive that can be used.

The exterior finishing material can be affixed directly to the insulating material or to an intermediate surface such as, for example, the surface of a reinforcing member as described above. The exterior finishing material has weathering characteristics and is preferably appealing in appearance. Presently, the most widely used exterior finish is an acrylic resin-based composition which is available in a paste-type form which is spread or troweled on the underlying substrate. One type of such composition can be described as a ready-mixed synthetic resin plaster. After application, the resin sets to form a tough, weather-resistant solid material which adheres tightly to the underlying substrate. Such resin compositions are available commercially in a variety of colors. They include optionally aggregate which can vary in size. This allows the applicator to choose a particular composition which permits him to apply a finish that can vary in texture from fine to coarse. Finishes which have a stucco-like appearance are popular. Small stones of various colors can be embedded in the composition for decorative purposes.

Examples of other materials that can be used as an exterior finish are Portland cement stucco including, for example, sand and larger aggregate.

The exterior finish can vary in thickness over a wide range, with a thickness of about 1/16" to about ¼" being exemplary.

Turning now to a description of the improved support member for use in exterior systems and of the gypsum board that can be used in improved shaft wall assemblies of the present invention, it comprises a set gypsum core faced with a fibrous mat. The gypsum core is basically of the type used in those gypsum structural products which are known as gypsum wallboard, dry wall, gypsum board and gypsum sheathing. The core of such a product is formed by mixing water with powdered anhydrous calcium sulfate or calcium sulfate hemihydrate ($CaSO_4 \cdot \frac{1}{2}H_2O$), also known as calcined gypsum; and thereafter allowing the mixture to hydrate or set into calcium sulfate dihydrate ($CaSO_4 \cdot 2H_2O$), a relatively hard material. The core of the product will in general comprise at least about 85 wt. percent of set gypsum.

The composition from which the set gypsum core is made can include optional constituents, including, for example, those included conventionally in gypsum sheathing. Examples of such constituents include set accelerators, retarders, foaming agents, and dispersing agents. As will be described in more detail below, a preferred gypsum core for use in exterior systems includes one or more additives which improve the water resistant properties of the core.

The surface of the core to which the insulating material of the system is affixed is faced with a fibrous mat. The fibrous mat should be sufficiently porous to permit water in the aqueous gypsum slurry from which the gypsum core is made to evaporate therethrough. As described in detail below, the fibrous mat-faced gypsum board can be made efficiently by forming an aqueous gypsum slurry which contains excess water and placing thereon the fibrous mat. Aided by heating, excess water evaporates through the porous mat after the calcined gypsum sets.

The fibrous mat comprises material which is capable of forming a strong bond with the set gypsum comprising the core of the gypsum board. Examples of such materials include a mineral-type material such as glass fibers and synthetic resin fibers. The mat can comprise continuous or discrete strands or fibers and be woven or nonwoven in form. Nonwoven mats such as chopped strand mat and continuous strand mat can be used satisfactorily and are less costly than woven materials. The strands of such mats are bonded together by suitable adhesive. The mat can range in thickness, for example, from about 15 to about 40 mils, with a thickness of about 25 to about 35 mils being preferred. The aforementioned fibrous mats are known and are commercially available in many forms.

The preferred fibrous mat is a fiber glass mat comprising fiber glass filaments oriented in random pattern and bound together with a resin binder. Fiber glass mats of this type are commercially available, for example, those sold under the trademark DURA-GLASS by Manville Building Materials Corporation and those sold by Elk Corporation as BUR or shingle mat.

Although improvements in an EISystem and in other structural assemblies can be realized by the use of a gypsum core which has but one of its surfaces faced with fibrous mat as described herein, it is preferred that both surfaces of the core can be faced with substantially the same fibrous material. If the surfaces of the core are faced with materials that have different coefficients of expansion, the core tends to warp. Fibrous mat-faced gypsum board and methods for making the same are known, for example, as described in Canadian Patent No. 993,779 and U.S. Pat. No. 3,993,822.

As mentioned above, a preferred form of the fibrous mat-faced gypsum board for use in exterior systems comprises a gypsum core which has water-resistant properties. The preferred means for imparting water-resistant properties to the gypsum core is to include in the gypsum composition from which the core is made one or more additives which improve the ability of the set gypsum composition to resist being degraded by water, for example, to resist dissolution. In preferred form, the water resistance of the core is such that it absorbs less than about 10%, preferably less than about 7.5% and most preferably less than about 5% water when tested in accordance with ASTM method C-473 with only the edges exposed.

The fibrous mat for use in structural systems described herein has substantially better water-resistant properties than the conventional paper facing of gypsum wallboard or sheathing. Nevertheless, evaluations have shown that the bond between the fibrous mat and gypsum core can deteriorate relatively quickly under the influence of water. For example, samples exposed to the weather showed loosening at the glass fiber facing within one to two months. In contrast, evaluations of water-resistant gypsum core faced with fibrous mat, as described herein, have shown the bond between the mat and core resists being degraded by water for indefinite periods of time.

Examples of materials which have been reported as being effective for improving the water-resistant properties of gypsum products are the following: poly(vinyl alcohol), with or without a minor amount of poly(vinyl acetate); metallic resinates; wax or asphalt or mixtures thereof; a mixture of wax and/or asphalt and also cornflower and potassium permanganate; water insoluble thermoplastic organic materials such as petroleum and natural asphalt, coal tar, and thermoplastic synthetic resins such as poly(vinyl acetate), poly(vinyl chloride) and a copolymer of vinyl acetate and vinyl chloride and acrylic resins; a mixture of metal rosin soap, a water soluble alkaline earth metal salt, and residual fuel oil; a mixture of petroleum wax in the form of an emulsion and either residual fuel oil, pine tar or coal tar; a mixture comprising residual fuel oil and rosin; aromatic isocyanates and diisocyanates; organohydrogenpolysiloxanes; a wax-asphalt emulsion with or without such materials as potassium sulfate, alkali and alkaline earth aluminates, and Portland cement; a wax-asphalt emulsion prepared by adding to a blend of molten wax and asphalt an oil-soluble, water-dispersing emulsifying agent, and admixing the aforementioned with a solution of casein which contains, as a dispersing agent, an alkali sulfonate of a polyarylmethylene condensation product.

A preferred material for use in improving the water-resistant properties of the gypsum core comprises wax-asphalt emulsion, species of which are available commercially. The wax portion of the emulsion is preferably a paraffin or microcrystalline wax, but other waxes can be used also. The asphalt in general should have a softening point of about 115° F., as determined by the ring and ball method. The total amount of wax and asphalt in the aqueous emulsion will generally comprise about 50 to 60 wt. percent of the aqueous emulsion, with the weight ratio of asphalt to wax varying from about 1 to 1 to about 10 to 1. Various methods are known for preparing the wax-asphalt emulsion, as reported in U.S. Pat. No. 3,935,021 to D. R. Greve and E. D. O'Neill, assigned to the same assignee as the present invention. Commercially available wax asphalt emulsions that can be used in the composition described herein are sold by United States Gypsum Co. (Wax Emulsion), Monsey Products, (No. 52 Emulsion) and Douglas Oil Co. (Docal No. 1034). The amount of wax-asphalt emulsion used can be within the range of about 3 to about 10 wt. percent, preferrably about 5 to about 7 wt. percent, based on the total weight of the ingredients of the composition from which the set gypsum core is made, said ingredients including the water of the wax-asphalt emulsion, but not including additional amounts of water that are added to the gypsum composition for forming an aqueous slurry thereof.

A particularly preferred material for use in improving the water-resistant properties of the gypsum core comprises a mixture of materials, namely, poly(vinyl alcohol) and wax-asphalt emulsion of the aformentioned type. The use of such additives to improve the water resistance of gypsum products is described in aforementioned U.S. Pat. No. 3,935,021.

The source of the poly(vinyl alcohol) is preferably a substantially completely hydrolyzed form of poly(vinyl acetate), that is, about 97 to 100% hydrolyzed polyvinyl acetate. The poly(vinyl alcohol) should be cold-water insoluble and soluble in water at elevated temperatures, for example, at temperatures of about 140° to about 205° F. In general, a 4 wt. percent water solution of poly(vinyl alcohol) at 20° C. will have a viscosity of about 25 to 70 cp as determined by means of the Hoeppler falling ball method. Commercially available poly(vinyl alcohols) for use in the composition of the present invention are available from E. I. du Pont de Nemours and Company, sold under the trademark "Elvanol" and from Monsanto Co., sold under the trademark "Gelvatol". Examples of such products are Elvanol, Grades 71-30, 72-60, and 70-05, and Gelvatol Grades 1-90, 3-91, 1-60, and 3-60. Air Products Corp. also sells the product as WS-42.

The amounts of poly(vinyl alcohol) and wax-asphalt emulsion used should be at least about 0.05 wt. % and about 2 wt. % respectively. The preferred amounts of poly(vinyl alcohol) and wax-asphalt emulsion are about 0.15 to about 0.4 wt. % and about 3.0 to about 5.0 wt. % respectively. Unless stated otherwise, the term "wt. %" when used herein and in the claims means weight percent based on the total weight of the ingredients of the composition from which the set gypsum core is made, said ingredients including the water of the wax-asphalt emulsion, but not including additional amounts of water that are added to the gypsum composition for forming an aqueous slurry thereof.

As disclosed, the aforementioned U.S. application Ser. No. 583,874, gypsum board comprising a set gypsum core faced with a fibrous mat, as described hereinabove, and preferably gypsum board comprising a set gypsum core sandwiched between two sheets of porous glass mat, can be used as a component of a shaft wall assembly or similar assembly in the interior of a building. In such application, the fibrous mat-faced board can be used to particular advantage in place of conventional paper-faced gypsum core board or shaft liner panels, the core of which generally includes fire-resistant additives. Shaft wall assemblies including the fibrous mat-faced board have improved fire endurance relative to assemblies which include paper-faced gypsum core board. As mentioned hereinabove, assemblies of this type generally comprise metal framework or studs for support of the gypsum panels which form the walls of the shafts of elevators, stairwells, air shafts and the like. Examples of such assemblies are shown in U.S. Pat. Nos. 4,047,355; 4,324,082; and 4,364,212. Fibrous mat-faced board, as described herein, can be used, for example, in the assemblies described in the aforementioned patents as the shaft liner panels and/or as facing panels.

In applications of the type where fire-resistant properties are considered important, the core of the fibrous mat-faced gypsum board includes preferably one or more additives which improve the ability of the set gypsum composition to maintain its integrity when subjected to the heat of fire. Examples of materials which have been reported as being effective for improving the fire-resistant properties of gypsum products include mineral fibers such as, for example, glass fibers, asbestos fibers, and calcium sulfate whisker fibers. A mixture of one or more of such fibers can be used. Other exemplary materials which are known for use in conventional fire resistant gypsum board are unexpanded vermiculite, clay, colloidal silica and colloidal alumina. Typically, mineral fibers, and particularly glass fibers, are used in admixture with one or more of the aforementioned exemplary materials. For example, see U.S. Pat.

No. 3,616,173, assigned to the same assignee as the present invention.

A preferred material for use in improving the fire resistant properties of the fibrous mat-faced gypsum board comprises chopped glass fibers, for example, as described in aforementioned U.S. Pat. No. 3,616,173, the disclosure of which, as it relates to glass fibers, is incorporated herein by reference. Briefly described, said glass fibers are of the drawn textile glass fiber type, produced as continuous individual filaments and having a diameter of from about 0.0002 to about 0.001". The individual filaments are usually grouped into strands, the filaments having coated thereon a relatively weak, bonding type material, such as, for example, starch or other water softenable or soluble coating material. The bonding material helps to prevent abraiding between the several grouped filaments of each strand. Prior to the addition of the loosely bonded textile glass fibers to the core composition, the strands are cut into short lengths such as, for example, $\frac{1}{4}$" to 1". Once added to the aqueous slurry composition from which the core is made, the bonding or coating material dissolves, and the strands separate into individual fibers which become uniformly distributed throughout the slurry as the slurry is mixed.

The presence of mineral fibers in the core of fibrous mat-faced gypsum board in accordance with the present invention results in a product which has unusually high fire-resistant characteristics. For example, the presence of a predetermined amount of chopped glass fibers in the core of glass mat-faced gypsum board of predetermined thickness provides a product which has fire resistant characteristics that are significantly better than those of conventional paper-faced gypsum board that has a like amount of glass fibers in its core and a like thickness. The effects which flow from this development are significantly important and can desirably be taken advantage of in several different ways. For example, the development can be used to produce a glass mat-faced gypsum board which has a lower density than that of conventional paper-faced, glass fiber-containing gypsum board without sacrificing fire-resistant properties. Similarly, significantly lower amounts of glass fibers can be used in the glass mat-faced board without sacrificing fire-resistant properties.

The amount of glass fibers included in the core should be at least about 0.03 wt. % and can vary over a wide range, for example, from about 0.03 to about 0.3 wt. percent based on the total weight of the dry ingredients comprising the core, that is, the total weight of the ingredients before they are combined with water to make the aqueous slurry from which the core is formed. In preferred form, the amount of glass fibers comprises about 0.07 to about 0.2 wt. percent.

The core of the fibrous mat-faced board for use in fire-resistant applications can be fabricated according to available techniques into a density of desired value. For a relatively thick board, for example, a thickness in excess of one inch, the density of the core can be as low as about 35 lb/cu. ft. In conventional paper-faced board having a relatively low density, the bond between the gypsum core and paper facings is generally unsatisfactory due to the low density of the core. Preferably, the density of the core should not exceed about 47 lbs/cu. ft. It is believed that a density within the range of about 40 to about 47 lbs/cu. ft. will be used most widely. Board having a core density of about 41 to about 45 lbs/cu. ft. has a particularly good combination of properties, including good fire resistant characteristics and relatively low weight.

Another aspect of the present invention comprises a glass mat-faced gypsum board having a core comprising the set product of calcium sulfate and at least about 0.03 wt.% of glass fibers, said core having a density ranging from about 41 to about 47 lbs./cu.ft., and the amounts and proportions of ingredients comprising the core being such that when said board has a thickness of about 1 inch, a shaft wall test section including said one-inch board has a fire endurance rating of at least about three hours. The method for evaluating said fire endurance rating is described in detail hereinbelow in the Example section.

It should also be understood that included within the scope of this invention is glass mat-faced gypsum board which has a thickness less than or greater than one inch, so long as the core density falls within the above range, so long as the core includes the ingredients as set forth above, and so long as the particular core formulation involved, when part of a one-inch board having said density yields a board which results in said rating. It will be appreciated that a board having a thickness less than one inch generally will not have as good fire resistant properties as a one-inch board even if the densities of the cores and the ingredients, and the amounts, thereof, from which the cores are formed are the same. On the other hand, a board having a thickness greater than one inch will generally, have better fire resistant properties than a one-inch core, even though the core densities and the ingredients, and amounts thereof, from which the cores are formed are the same.

For use as shaft liner panels in a shaft wall assembly, it is recommended that there be used glass mat-faced gypsum board having a thickness of about 1", and a core density of about 41 to about 47 lbs./cu. ft., preferably no greater than about 45 lbs/cu. ft., and prepared from a formulation containing about 0.03 to about 0.3 wt. percent of glass fibers. In such an assembly, it is believed that the glass mat surface of the gypsum board assists in conducting heat away from the framework which supports the board, thus leading to improvements in the fire endurance of the assembly.

Glass mat-faced gypsum board, as described herein, and including also such board having a glass fiber-containing core, can be used also as board panels in one or more of the plies of facing layers which comprise shaft wall assemblies. In addition, the board can be used to advantage in any application of the type in which conventional fire-resistant gypsum board is generally used. The board can be fabricated into thicknesses which are popularly used, for example, $\frac{1}{4}$", $\frac{1}{2}$", $\frac{3}{4}$", and 1".

There are advantages to using that form of the board in which at least one of the surfaces of the board has set gypsum over substantial area portions thereof. The set gypsum appears to aid in dissipating heat as it is consumed in driving off the water hydration of set gypsum.

In applications where both fire resistance and improved weathering characteristics are desired, both fire-resistant and water-resistant additives can be included in the core.

The use of certain water-resistant additives may reduce the fire resistance of the board. In the event this occurs, such reduction in fire resistance can be offset by making the core more dense. In this type of situation, it is recommended that the core density be about 48 to about 55 lbs/cu. ft. to provide a $\frac{5}{8}$" board that achieves a one-hour fire rating according to ASTM E-119.

The fibrous mat of the gypsum board described herein is also a significant factor in reducing transmission of sound, a desirable characteristic, which can be taken advantage of in elevator shaft wall assemblies, as well as other structural assemblies where reduced sound transmission is desired. For example, in partition assemblies wherein a fibrous mat-faced board provides a support surface for a facing layer of material adhesively fastened thereto, the adhesive interface between the board and facing layer provides a resilient connection which tends to dissipate sound energy, thereby providing a sound resistant assembly.

An attractive feature of the present invention is that the fibrous mat-faced gypsum board can be made utilizing existing wallboard manufacturing lines, for example, as shown somewhat diagramatically in FIG. 1. In conventional fashion, dry ingredients (not shown) from which the gypsum core is formed are pre-mixed and then fed to a mixer of the type commonly referred to as a pin mixer 2. Water and other liquid constituents (not shown) used in making the core are metered into the pin mixer 2 where they are combined with the dry ingredients to form an aqueous gypsum slurry. Foam is generally added to the slurry in the pin mixer to control the density of the resulting core. The slurry 4 is dispersed through one or more outlets at the bottom of the mixer 2 onto a moving sheet of fibrous mat 6. The sheet of fibrous mat 6 is indefinite in length and is fed from a roll (not shown) of the mat.

Figure 7:
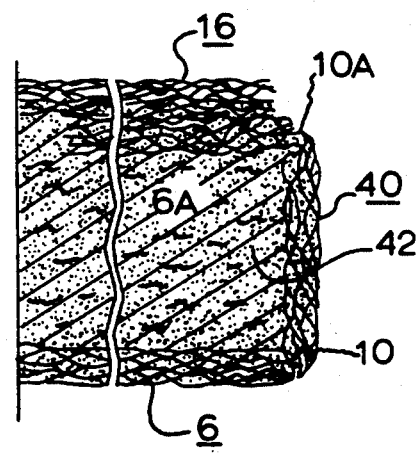
FIG. 7 is a transverse sectional view of an edge portion of the completed board, this view being taken as indicated by the line 7—7 on FIG. 4.

As is common practice in the manufacture of conventional paper-faced gypsum board, the two opposite edge portions of the fibrous mat 6 are progressively flexed upwardly from the mean plane of the mat 6 and then turned inwardly at the margins so as to provide coverings for the edges of the resulting board 40. In FIG. 1, this progressive flexing and shaping of the edges of the mat 6 are shown for only one side edge of the mat and the conventional guiding devices which are ordinarily employed for this purpose are omitted from the figure for the sake of clarity. FIG. 7 shows an edge of the set gypsum core 42 covered by the overlapped edge portion 6A of the mat 6. FIG. 7 shows also score marks 10 and 10A of the mat 6, the score marks permitting the formation of good edges and flat surfaces. The score marks 10 and 10A are made by a conventional scoring wheel 12. An advantage of using the preferred form of glass fiber mat is that it is capable of being scored and edged like conventional paper facing.

Another sheet of fibrous mat 16 is fed from a roll (not shown) onto the top of slurry 4, thereby sandwiching the slurry between the two moving fibrous mats which form the slurry. The mats 6 and 16 with the slurry 4 sandwiched therebetween enter the nip between the upper and lower forming or shaping rolls 18 and 20, and are thereafter received on a conveyer belt 22. Conventional edge guiding devices, such as indicated at 24 shape and maintain the edges of the composite until the gypsum has set sufficiently to retain its shape. In due course, sequential lengths of the board are cut and further processed by exposure to heat which accelerates the drying of the board by increasing the rate of evaporation of excess water in the gypsum slurry.

With reference to FIG. 7, it has been observed that the set gypsum of the core 42 is effective in forming satisfactory bonds with the mats and between the edge portions of the overlying mat 16 and the overlapped edge portion 6A of the underlying mat 6, thus making it unnecessary to use a bond improver in the slurry or an edge paste to form the aforementioned bonds.

Figure 2:
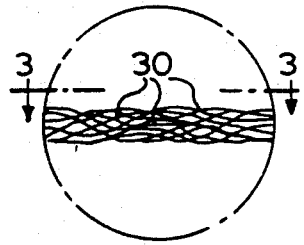
FIG. 2 is an enlarged fragmentary sectional view, taken as indicated toward the left of FIG. 1, of an underlying fiber glass mat used in the manufacture of the gypsum board.
Figure 3:
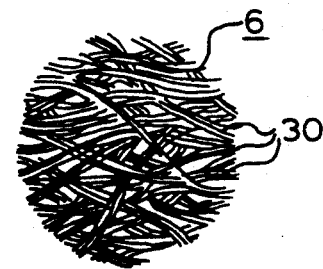
FIG. 3 is a fragmentary plan view taken as indicated by the line 3—3 on FIG. 2.

The preferred form of mats 6 and 16, as shown in FIGS. 2 and 3, comprises glass fiber filaments 30 oriented in random pattern and bound together with a resin binder (not shown).

Figure 4:
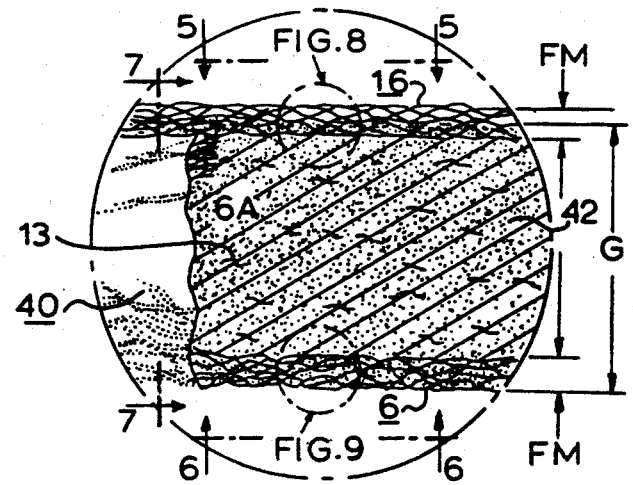
FIG. 4 is an enlarged sectional view taken as indicated toward the right on FIG. 1 and illustrating both underlying and overlying fiber glass mats, with intervening gypsum composition, used in the manufacture of the board.
Figure 5:
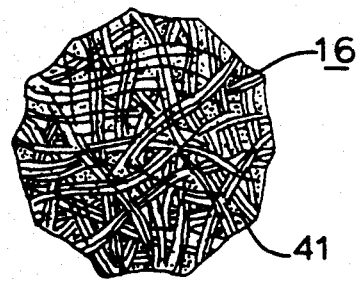
FIG. 5 is a fragmentary plan view taken as indicated by line 5—5 on FIG. 4.
Figure 6:
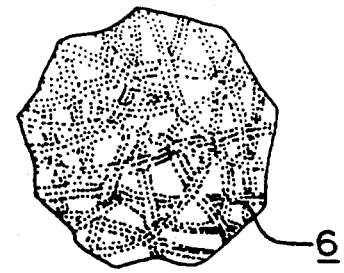
FIG. 6 is a fragmentary bottom view taken as indicated by the line 6—6 on FIG. 4 and illustrating the bottom surface underlying mat of the board.
Figure 8:
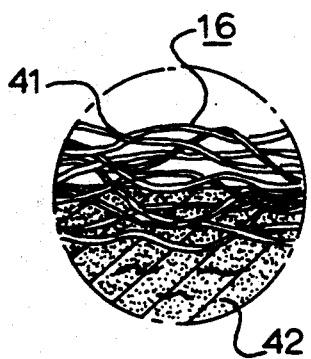
FIG. 8 is a further enlarged fragmentary sectional view taken as indicated toward the top of FIG. 4.
Figure 9:
FIG. 9 is a further enlarged fragmentary sectional view taken as indicated toward the bottom of FIG. 4.

A preferred form of glass fiber mat-faced gypsum board 40 is shown in FIGS. 4 and 7. It comprises one in which the set gypsum of the core 42 penetrates substantially through the thickness of the mat 6 over substantial area portions thereof and in which the set gypsum of the core 42 penetrates the mat 16 partially, with the surface being thus substantially free of set gypsum. The gypsum-free surface of mat 16, as seen in FIG. 8, is highly textured, and provides an excellent substrate for adhering thereto an overlying component inasmuch as it comprises many interstices into which an adhesive composition can flow and bond.

Figure 10:
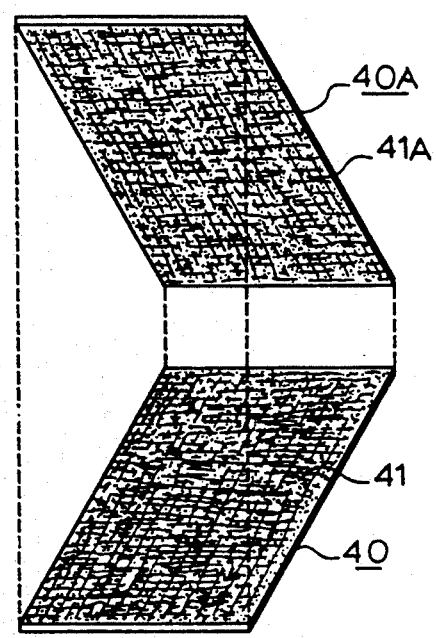
FIG. 10 is a view illustrating two complete gypsum boards fabricated according to the present invention and being assembled for packaging, with the top fibrous mats of the two boards presented toward each other.
Figure 11:
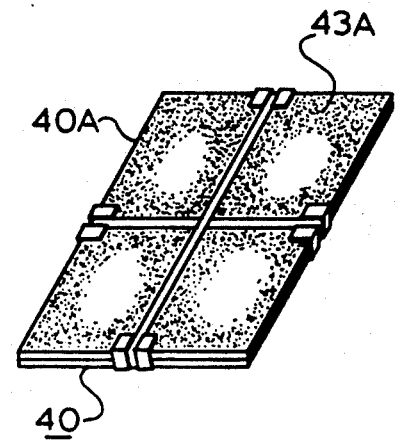
FIG. 11 is a view of two boards assembled in the manner indicated in FIG. 10 and bound together for purposes of shipping.

In shipping gypsum board, it is convenient to package two boards 40 and 40A together (see FIG. 10 and 11), with the glass fiber gypsum-free surfaces 41 and 41A in face to face relationship, and thus protected, and with the gypsum-coated surfaces (for example, 43A in FIG. 11) forming the outside of the package. The set gypsum on the outside surfaces helps to keep the board from being damaged during handling, shipping and storage, and protects the skin of those who come in contact with the board from being irritated by the glass fibers of the mat.

The phrase "substantially penetrated by set gypsum", as used herein, means that the set gypsum of the core, extends from the mat surface which is contiguous to the core to the outer mat surface and coats glass fibers on the outer surface with a thin film of set gypsum to the extent that the outline of glass fibers can be seen through the thin film of set gypsum. The phrase "over substantial area portions of the outer surface", as used herein, means that about 30 to 75% of the outer surface area of the mat is substantially penetrated by set gypsum. Preferably, about 45 to about 55% of the outer surface area of the mat is substantially penetrated by set gypsum. Accordingly, the gypsum-coated surface of this preferred embodiment of the board comprises a surface that has a roughened or patterned appearance; it does not comprise a smooth continuous coating of set gypsum. This preferred form of board can be formed with relatively small amounts of gypsum slurry being deposited on the underlying support surface, thus minimizing the need to clean the surface of the board-forming equipment.

The need for such cleaning can be substantially avoided by adjusting the viscosity of the slurry so that it penetrates but part-way through the underlying fibrous mat, for example, up to about 50% of its thickness. Thus, this preferred form of board has two gypsum-free fiber-faced surfaces.

The manufacture of the aforementioned preferred forms of board can be accomplished by controlling the viscosity of the aqueous slurry of the calcined gypsum in a manner such that the slurry penetrates the underlying and overlying mats to the desired degree. In manufacturing each of the aforementioned preferred forms of board, the viscosity of the slurry should be such that it penetrates about 10 to 50% of the thickness of the overlying mat over the entire surface area thereof.

The recommended means for controlling the viscosity of the slurry is to add thereto a viscosity-control agent. Such viscosity-control agents are known in the field of gypsum board manufacture. A preferred viscosity-control agent is paper fiber. Examples of other agents that can be used are cellulosic thickeners, bentonite clays, starches, and gypsum whisker fibers.

The particular viscosity values that are used in the manufacturing operation can vary from one application to the next, depending on the porosity of the mat, the hydration rate of the calcined gypsum and the desired penetration of the slurry. Accordingly, for any particular application, the viscosity value is best determined empirically.

In using the preferred form of glass fiber mat, as described above, to manufacture the aforementioned preferred forms of board, developmental work has shown that satisfactory results can be achieved utilizing a gypsum slurry having a viscosity within the range of about 5000 to 7000 cp. As used herein, the viscosity value refers to Brookfield viscosity measured at a temperature of 70° F. at 10 rpm utilizing paddle No. 3. It should be appreciated that the amount of viscosity-control agent added to the slurry to give the desired viscosity will vary depending on the particular agent used and the specific viscosity desired.

In preferred form, the core of the fibrous mat-faced gypsum board of the type used in EISystems has a density of about 40 to about 47 lbs/cubic ft., most preferably about 41 to about 45 lbs/cubic ft. The manufacture of cores of predetermined densities can be effected by using known techniques, for example, by introducing an appropriate amount of foam into the aqueous gypsum slurry from which the core is formed. There are weight advantages that can be realized by the use of fibrous mat-faced gypsum board in EISystems and in fire-resistant applications in that fibrous mats which are lighter in weight than conventional paper facing are available. For example, the weight of a widely used paper facing in the manufacture of conventional gypsum sheathing is in the range of about 120 lbs/1000 sq. ft. of board, whereas the weight of a preferred form of glass fiber mat for use in the present invention is about 40 lbs/1000 sq. ft. of board.

Figure 12:
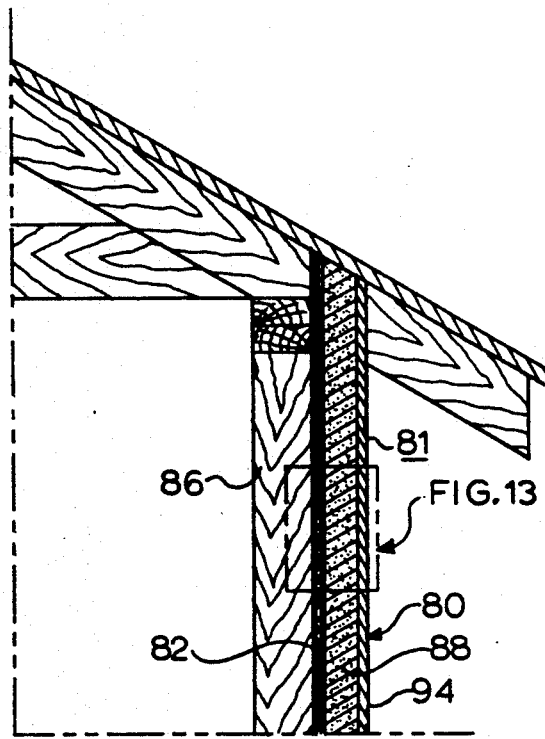
FIG. 12 is a somewhat diagrammatic vertical sectional view through the upper portion of an external building wall, as insulated in accordance with the present invention.
Figure 13:
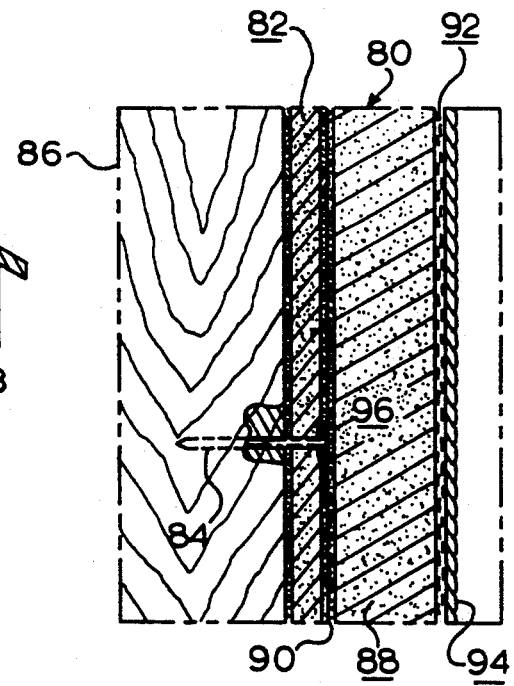
FIG. 13 is an enlarged vertical sectional view taken substantially as indicated on FIG. 12.

Turning now to FIGS. 12 and 13, there is shown therein an example of an exterior insulating system fabricated in accordance with the present invention and comprising the exterior portion of the building 81. The EISystem 80 comprises panels of fibrous mat-faced board 82 affixed by nails 84 to wood framing 86. A foamed polystyrene panel 88, about 1 inch thick, is adhered to the fibrous mat-faced board 82 by adhesive 90. A reinforcing member comprising glass fiber skrim 92 is sandwiched between the polystyrene panel 88 and the final finishing material 94 by adhesive 96.

Various of the preferred forms of the gypsum board of the present invention can be used also to good advantage in place of conventional gypsum sheathing in applications other than EISystems. Thus, the preferred forms of board can be used as an underlying support surface which is covered with overlying finishing materials, for example, aluminum, wood siding, plaster, brick and Portland cement stucco.

Figure 14:
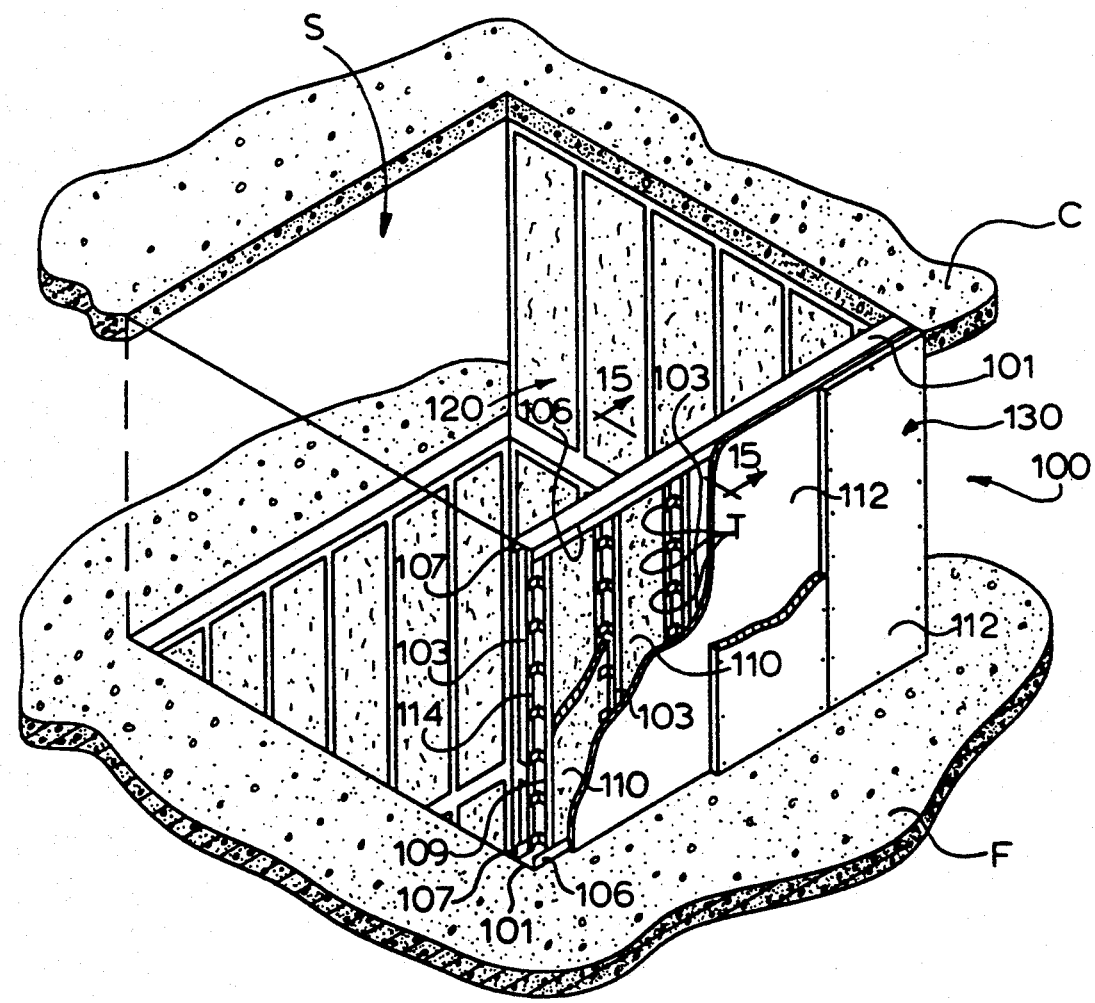
FIG. 14 is an elevated view illustrating installation of a typical shaft wall assembly enclosing a shaft between floors of a building.

With reference to FIGS. 14, 15 and 16, there is shown an example of a typical commercial shaft wall assembly in which fibrous mat-faced gypsum board as described herein can be used. Shaft wall assembly 100 comprises metal framework consisting of ceiling- and floor-mounted J-tracks 101 and I-studs 103 for supporting gypsum board panels 110 and 112. J-tracks 101 are fastened by bolts 104 to the ceiling C and to the floor F adjacent to the shaft S to be enclosed. Each J-track has a short leg 106 and a long leg 107, the long leg 107 lying in substantially the same plane as the shaft side 120 of shaft wall assembly 100. I-studs 103 are positioned vertically between the ceiling and floor J-tracks 101. The terminal ends of I-studs 103 are friction-fit between the legs 106 and 107 of the ceiling and floor J-tracks. Generally described, I-studs 103 comprise flanges 109 and 109' extending perpendicularly from an intermediate body portion 114.

Tabs T are cut and folded out of the metal sheet from which I-studs 103 are made. The forming of such tabs results in forming holes 140 in body portion 114 of the I-studs.

Gypsum board panels 110 comprising the shaft liner panels of the assembly, are positioned between legs 106 and 107 of J-tracks 101, with the vertical edges of said panels being friction-fit between the I-stud tabs T and flanges 109. Facing layers of gypsum board panels 112 are fastened by screw fasteners 113 to the face side 130 of shaft wall assembly 130. Two facing layers or plies of gypsum board panels 112 are illustrated, although it should be understood that additional facing layers of board may be applied, as desired. Facing layers of gypsum board panels may also be applied to the shaft side of the assembly in stairwell applications where a finished wall surface is desired.

In the embodiment shown in FIGS. 14 to 16, gypsum board panels 110 (shaft liner panels of the assembly) are intended to be shown as comprising a gypsum core sandwiched between and faced with glass mats, as described herein, and gypsum board panels 112 (the facing layers of the assembly) are intended to be shown as comprising a gypsum core sandwiched between and faced with paper. Exemplary alternative embodiments include the use of panels comprising a gypsum core having but one side faced with a fibrous mat and oriented in the assembly with the "mat" facing the shaft and the use of fibrous mat-faced gypsum board in one or more plies of the facing layers.

EXAMPLES

The formulation set forth below is an example of a preferred aqueous gypsum slurry which can be used in making the core of a gypsum support member for use in an EISystem.

| Constituents | Lbs./1000 sq.ft. of board |
| --- | --- |
| calcined gypsum (CaSO$_4$.½H$_2$O) | 1380 |
| wax/asphalt emulsion | 130 |
| aqueous solution of 10 wt % poly (vinyl alcohol) | 56 |
| paper fiber | 15 |
| set accelerator | 6 |
| ammonium lauryl sulfonate (foaming agent) | 1 |
| calcium lignosulfonate (dispersing agent) | 2 |
| water | |

The wax/asphalt emulsion used in the above formulation contained approximately 48 wt. % solids of which about 11 wt. % was paraffin wax and about 37 wt. % was asphalt. The set accelerator comprised about 80 wt. % potash, about 12 wt. % lignosulfonate and about 8 wt. % ground gypsum.

The above formulation was used to prepare gypsum board, the surfaces of which were covered with nonwoven fiber glass mat. The mat was composed of glass fiber filaments oriented in a random pattern bonded together by an adhesive referred to by the manufacturer as a "modified urea-formaldehyde resin". The mat had a thickness of 33 mils, and was more porous than paper of the type used as the cover sheet of gypsum wallboard. The air permeability of the mat was 700 CFM/sq. ft. (test method FG 436-910). The mat is available commercially as DURA-GLASS 7502-2 lbs. and is an example of a preferred fibrous mat for use in the practice of the present invention.

Continuous length board was made from the above gypsum slurry and glass fiber mat on a conventional wallboard machine. The slurry was fed onto a moving sheet of the mat as it was unrolled from a roll onto a moving support surface. The mat had a width of about 51 inches and was scored continuously by conventional scoring blades prior to the deposition of the slurry thereon. Each edge of the mat was scored with two score marks, with each of the outer scores being about 1 inch from its respective edge of the mat and each of the inner scores being about 1½ inch from its respective edge. After the slurry was deposited on the mat, the edges were folded at the score marks and overlapped on top of the slurry. (The gypsum core formed from this operation had a width of 47⅞ inches and a thickness of ½ inch.) Mat from another roll thereof and having a width of 47½ inches was fed onto the top of the gypsum slurry and the overlapped edge portions of the underlying mat. The gypsum slurry penetrated the overlapped edge portions and served to bond the edge portions of the overlying mat to the overlapped edge portions of the underlying mat.

The viscosity of the gypsum slurry was about 5900 cp at 70° F. At this viscosity, the slurry penetrated substantially through some portions of the underlying mat to form a thin film thereof on about 40 to 50% of the area of the outer surface of the mat. As the gypsum in the film set, substantial portions of the outer surface of the mat were covered with a thin film of set gypsum. The surface had a roughened appearance with outlines of the glass filaments being observable underneath the thin coatings of gypsum which covered them. However, at the aforementioned viscosity, the slurry penetrated but a portion (about 5 mils) of the thickness of the overlying mat over the entire area thereof, with no slurry being observed on the outer surface of the mat. As the gypsum set in the intermediate portions of the mat that were penetrated by the slurry, it formed a bond that included a mechanical interlock with the set gypsum core.

The continuous length board is cut into lengths of about 8 feet. Drying of the gypsum board is accelerated by heating in an oven at 350° F. for about 2 hours and until the board is almost dry and then at 200° F. for about 1 hour until it is dried completely. The density of the board is about 43 lb. cu.ft.

The gypsum-free surfaces of panels (2'×2') of glass fiber-faced boards as described above were adhered to panels of expanded polystyrene utilizing two different commercially available adhesive systems. In one system, hereinafter "System A", one of the faces of a panel of expanded polystyrene having a thickness of about 1 inch and 2'×2' was smeared with an adhesive mixture comprising cement, sand, and resin binder utilizing a ⅜"×⅜" toothed trowel. The panel was then adhered to the glass fiber-faced gypsum board. Thereafter, glass fiber reinforcing mesh was applied to the other face of the panel of expanded polystyrene and a decorative finish was applied to the mesh.

In the other system, hereafter "System B", the same steps as described above for System A were followed except that an acrylic adhesive was applied to the gypsum-free surface of the board and the polystyrene panel adhered thereto.

Two additional systems like Systems A and B above were assembled, except that conventional paper-faced gypsum sheathing was substituted for the glass fiber-faced gypsum board in each of Systems A and B.

The integrity of each of the systems was evaluated using 1½"×1½" cross-sectional cubes which were extracted from the systems and which were pulled apart in a tensile test apparatus. The results of the testing are set forth below.

| System | Fiber Glass-Faced Board | Paper-Faced Board |
| --- | --- | --- |
| A | 100% break in the polystyrene panel | 66% break in the paper, 33% break in the polystyrene |
| B | 100% break in the polystyrene panel | 100% break in the paper |

From the above results, it can be seen that the use of the glass fiber-faced gypsum support surface improved significantly the strength of the assembly in that tensile failure was transferred from the paper cover of the gypsum sheathing to the foamed polystyrene, with no failure at all experienced in the glass fiber mat or the gypsum core to which it was adhered. Thus, it should be appreciated that the integrity of an EISystem can be improved significantly because it is no longer dependent upon the ply strength of a paper cover sheet, but upon a component having much higher strength.

Glass fiber-faced gypsum boards, made as described above, and with their edges protected, were placed outdoors for several months and exposed to the elements. During that period the boards were exposed to about 20 inches of rain. After this exposure, the boards were examined and found to be in excellent condition with no signs of deterioration.

Other outdoor tests have shown that glass fiber mat-faced gypsum board having a core which includes wax-asphalt emulsion as a water-resistant additive better resists deterioration than a like board having a core which includes sodium methyl siliconate as the water-resistant additive.

In the examples which follow, glass fiber mat-faced gypsum boards falling within the scope of the present invention were installed and evaluated for fire endurance in test sections of conventional shaft wall assemblies of the general type shown in the drawings.

The metal components of the shaft wall metal framework were supplied by Georgia Pacific Corporation and were manufactured from 25 gauge hot dipped galvanized steel. The components consisted of four J-tracks having a 2⅜" wide base portion from which 2¼" and 1" legs extended and a single I-stud which was 1⅜" wide and 2½" deep. The J-tracks were fastened by bolts to horizontal and vertical edges of a masonry framing structure. The ends of the I-stud were friction-fit between the legs of the upper and lower horizontally positioned J-tracks. For convenience, the side of the assembly defined by the mean plane of the long legs of the J-tracks is referred to hereafter as the "shaft side";

the side of the assembly defined by mean plane of the short legs of the J-tracks is hereafter referred to as the "face side."

In each of the shaft wall assemblies that were tested, there were used two 1" thick gypsum boards having respective dimensions of 15"×66" and 24"×66". The boards were inserted between the legs of the upper and lower horizontal J-tracks on either side of the I-stud, and their longest dimensions vertically oriented. Vertical edges of the boards, positioned adjacent the I-stud, were friction-fit between the I-stud tabs and flanges, thereby sandwiching the I-stud between the edges of the boards. The opposite vertical edges of the boards were secured to the long legs of the vertically positioned J-tracks by 1¼" Type S screws 24" on center (O.C.) such that the long legs overlapped the boards on their shaft side.

Each of the glass fiber mat-faced gypsum boards that were tested had a substantially gypsum free-face and a face having gypsum over substantial area portions thereof. The boards were prepared according to the basic process that was used to prepare the glass mat-faced boards of the previous examples and were faced with the same type of glass mat. Each of the boards was installed in its test assembly so that its gypsum free-face was exposed to the shaft side of the assembly. Following installation of the glass fiber mat-faced gypsum boards in the metal assembly, facing layers of paper-faced gypsum board were fastened to the face side of the metal framework. These facing layers are described in more detail hereinbelow.

The resulting assembly positioned in the aforementioned masonry frame formed one wall of a test furnace. The furnace was fired with multiple gas burners positioned such that the yellow luminous flame from each burner impinged on the face of the specimen thereby maintaining a uniform temperature thereover. Furnace temperature was gradually increased according to the standard time temperature curve of ASTME 119, as shown below.

| Time (minutes) | Temp. (°F.) | Time (minutes) | Temp. (°F.) |
|---|---|---|---|
| 5 | 1000 | 120 | 1850 |
| 10 | 1300 | 180 | 1925 |
| 30 | 1550 | 240 | 2000 |
| 60 | 1700 | | |

Temperature measurements of the test assembly were made by eight Chromel-Alumel (Type K) thermocouples, four of which were positioned on the furnace exposed side and the remaining four of which were positioned on the unexposed side of the assembly.

Fire endurance of each assembly tested was measured as time taken for either (1) the average temperature of the unexposed side, as measured by the four thermocouples, to reach 250° F. above ambient temperature or (2) any individual thermocouple temperature measurement to reach 325° F. above ambient temperature. Once either of these two temperatures was reached, the test was concluded and the time measured from the start of the test was recorded. During each test, observations were made of each assembly respecting board deterioration, cracking, distortion and metal component failure.

The evaluations involved 2-hour fire endurance tests and 3-hour fire endurance tests, as described below.

2-HOUR TESTS

Five two-hour fire endurance tests were conducted as described below. In three of the tests, 1" thick glass fiber mat-faced gypsum board was installed in a test section of a conventional shaft wall assembly as described above. For comparative purposes, the other two tests were conducted using conventional 1" thick paper-faced gypsum board sold under the trademark SHAFTLINER by Georgia-Pacific Corporation.

In each shaft wall assembly tested, two facing layers (an inner layer and an outer layer) of gypsum board were fastened to the face side of the metal framework. These two layers consisted of ½" fire resistant gypsum boards, the core composition of which is set forth below. Two such boards, each having dimensions of 33"×39", their longest dimensions oriented horizontally, were fastened to the face side of the framework using 1" Type S screws, 24" O.C. to form an inner facing layer. The joint formed between the edges of these two boards extended horizontally and was not finished. The outer facing layer consisted of a single gypsum board having dimensions of 39"×66", the longest board dimension being vertically oriented. The board was fastened over the boards of the inner facing layer using 1⅝" Type S screws, 16" O.C.

The aforementioned ½" fire resistant gypsum boards that were used in the tests are sold by Georgia-Pacific Corporation under the trademark FIRESTOP, Type "XXX". Such boards have a density of about 48 pounds/cu. ft. and comprise a set core made from the following composition.

| Ingredients | Wt. % based on total weight of ingredients prior to addition of mixing water |
|---|---|
| finely ground calcium sulfate hemihydrate | 94.67 |
| clay (aluminum silicate) | 2.59 |
| unexpanded vermiculite | 1.10 |
| glass fiber roving, ½" | 0.44 |
| chopped glass fiber roving core adhesive | 0.52 |
| dispersing agent | 0.10 |
| foaming agent | 0.06 |
| accelerator | 0.52 |
| | 100.00 |

In three of the 2-hour tests that were conducted, the shaft side of each assembly was exposed to the gas flame inside the furnace. The face side of the tested assembly faced outside the furnace and was not exposed to flame. Table 1 below includes a description of the 1" boards that were used in the shaft wall assemblies that were tested and the fire endurance rating for each of the tested assemblies.

TABLE 1

| | TEST 1 glass fiber mat-faced gypsum board, Board G-1 | TEST 2 glass fiber mat-faced gypsum board, Board G-2 | TEST 3 paper-faced gypsum board, Board P |
|---|---|---|---|
| calcium sulfate dihydrate | | | |
| glass fiber (lbs/1000 ft.²) | 2.18 (0.056 wt %) | 2.18 (0.065 wt %) | 5.9 (0.15 wt %) |
| paper fiber (lbs/1000 ft.²) | 19.45* | 19.45* | 1.0* |

TABLE 1-continued

|  | TEST 1<br>glass fiber<br>mat-faced<br>gypsum board,<br>Board G-1 | TEST 2<br>glass fiber<br>mat-faced<br>gypsum board,<br>Board G-2 | TEST 3<br>paper-faced<br>gypsum board,<br>Board P |
|---|---|---|---|
| board thickness (inches) | 1.023 | 1.081 | 0.963 |
| density (lbs/ft.$^3$) | 45 | 37 | 50 |
| board weight (lbs/1000 ft.$^2$) | 3875 | 3348 | 4015 |
| fire endurance (hours) | 2.0 | 1.92 | 1.82 |

*The difference in paper fiber content is primarily due to the slurry viscosity control function which the fibers perform in regulating the degree of slurry penetration into the glass fiber mats.

Calculations show that the cores of glass fiber mat-faced gypsum Boards G-1 and G-2 contain 63% less glass fiber than the core of Board P, that is, the conventional paper-faced board. Although Board G-1 is 10% less dense than the conventional board, the shaft wall assembly containing Board G-1 showed a 9% improvement in fire endurance over the assembly which included Board P. Although Board G-2 is 17.5% lighter in weight and 26% less dense than Board P, the shaft wall assembly including Board G-2 showed a 5% improvement in fire endurance over the assembly including the conventional board. Thus, even though Boards G-1 and G-2 contained less glass fibers in their cores and were less dense than the conventional paper-faced board, test assemblies including the former boards showed an average 7% improvement in fire endurance over the assembly which included Board P.

In contrast to the previous three tests, the following two tests were conducted on shaft assemblies in which the face side of the assembly was exposed to the gas flame inside the furnace; the shaft side faced outside the furnace and was not exposed to flame. Table 2 below includes a description of the 1" boards that were used in the shaft wall assemblies that were tested and the fire endurance rating for each of the tested assemblies.

TABLE 2

|  | TEST 4<br>glass fiber<br>mat-faced<br>gypsum board,<br>Board G-3 | TEST 5<br>paper-faced<br>gypsum board,<br>Board P-1 |
|---|---|---|
| calcium sulfate dihydrate |  |  |
| glass fiber (lbs/1000 ft.$^2$) | 2.18<br>(0.06 wt %) | 5.9<br>(0.15 wt %) |
| paper fiber (lbs/1000 ft.$^2$) | 19.45 | 1.0 |
| board thickness (inches) | 1.086 | 0.977 |
| density (lbs/ft.$^3$) | 39 | 48 |
| board weight (lbs/1000 ft.$^2$) | 3534 | 3981 |
| fire endurance (hours) | 2.32 | 2.0 |

Calculations show that the core of Board G-3 contains 63% less glass fiber than the core of Board P-1, that Board G-3 is 11% lighter in weight than Board P-1 and is 20% less dense than Board P-1. Nevertheless, the shaft wall assembly including Board G-3 showed a 14% improvement in fire endurance over the assembly including Board P-1.

3-HOUR TEST

A 3-hour fire endurance test was conducted as described below. A 1" thick glass fiber mat-faced board having a density of 42 lbs/ft.$^3$ was installed in a test section of a conventional shaft wall assembly as described earlier. The core composition of the board, referred to herein as G-4, is set forth below.

| Constituents | Wt. % of Set &<br>dried Composition | lbs/1000 ft.$^2$ of set<br>& dried Composition |
|---|---|---|
| calcium sulfate dihydrate | 99.081 | 3388.6 |
| glass fiber ($\frac{1}{2}$" glass fiber roving) | 0.063 | 2.2 |
| paper fiber (sulfite) | 0.561 | 19.2 |
| dispersing agent (lignosite) | 0.226 | 7.7 |
| commercial retarder | 0.021 | 0.7 |
| foaming agent (ammonium lauryl sulfonate, "Micro Foam CP") | 0.048 | 1.6 |

The face side of the assembly which was tested included three facing layers of conventional gypsum board having a thickness of $\frac{5}{8}$" and a core composition as set forth below. The innermost facing layer was formed from two such boards having respective dimensions of 15"×66" and 24"×66", their longest dimensions oriented vertically. These boards were fastened to the short legs of the J-tracks and I-stud flanges using 1" Type S screws, 24" O.C. The joint formed between the edges of these boards was centered over the I-stud. The joint was not finished. The boards forming the intermediate and outer facing layers had the same length and width dimensions and were positioned in the same orientation as the inner and outer facing layers of the assembly described above for the two-hour tests. The outermost facing layer was fastened in place using 2¼" Type S screws. The face side of the test assembly was exposed to the gas flames of the furnace, the shaft side remaining unexposed to flames.

The paper-faced gypsum boards were Type "X" board sold by Georgia-Pacific Corporation under the trademark FIRESTOP. These facing boards have an average weight of 2350 lbs/1000 ft.$^2$ and a core composition as set forth below.

| Component | lbs/1000 ft$^2$ | wt. % |
|---|---|---|
| glass fiber (chopped glass roving) | 5.0 (minimum) | 0.2 |
| core adhesive | 13.0 (maximum) | 0.53 |
| dispersant | 12.0 (maximum) | 0.54 |
| foaming agent | as necessary to achieve minimum dry weight. |  |
| accelerator | as necessary to achieve a slurry setting time of 4 to 5 minutes. |  |
| gypsum | board weight less the total weight of additives and a paper cover sheet weight of 120 lbs/1000 ft.$^2$ |  |

During the test, the temperature of the flame-exposed face of the assembly rose at a rate of approximately 88° F./minute in the first 15 minutes of the test, 9° F./minute in the second 15 minutes, and 1.8 F.°/minute for the remaining two hours and forty-five minutes of the test, and reached an average temperature after three hours and fifteen minutes of about 1,910° F. The average temperature measured on the unexposed face side of the assembly rose from approximately 77° F. (ambient temperature) to 327° F. over a period of time of three hours, thirteen minutes. The maximum temperature measured on the unexposed face side was 402° F. It was reached in three hours and twelve minutes. Thus, a fire endurance of 3.2 hours was achieved by the test assembly. There was no indication at any time during the test of pending integrity failure, as would have been manifested by the development of cracks or distortion, of either the furnace-exposed glass fiber mat-faced board or facing boards. The I-stud showed some evidence of buckling after three hours.

It is noted that, in conventional three-hour rated shaft wall assemblies, a ¾" Type "X" gypsum board is positioned in the assembly in the same manner as the 1" glass fiber mat-faced board described herein, and four layers of ⅝" Type "X" FIRESTOP board are applied to the face of the assembly, there being a space maintained between the third and outermost fourth layer of board. Thus, even though the glass mat-faced gypsum board described herein was but ¼" thicker than the conventional paper-faced board, the shaft assembly with Board G-4 included only three facing layers (instead of 4) of ⅝" Type "X" FIRESTOP board to achieve a fire endurance of better than three hours.

It will be appreciated from the above described tests that glass fiber mat-faced gypsum boards as described herein, when tested in shaft wall assemblies, show significant improvements in fire endurance over their conventional paper-faced counterparts despite the fact that their cores are significantly less dense and contain a significantly smaller quantity of fire resistant additives, namely glass fibers.

The next example involves the evaluation in a fire test of a ⅝" thick glass fiber mat-faced gypsum board having a core composition as set forth below and prepared according to the techniques described for glass fiber mat-faced gypsum boards of the earlier examples herein.

| Components | Wt. %, set & dried board |
|---|---|
| glass fiber mat facing | 1.58 |
| calcium sulfate dihydrate | 94.06 |
| glass fiber (¼" chopped glass roving) | 0.08 |
| paper fiber | 0.74 |
| potash (accelerator) | 0.15 |
| wax-asphalt emulsion | 2.96 |
| poly(vinyl alcohol) | 0.28 |
| calcium lingosulfonate (dispersing agent) | 0.11 |
| ammonium lauryl sulfonate (foaming agent) | 0.04 |

The density of the core of the board was 53 lbs/cu.ft. A fire rating of 1 hour and 30 seconds was achieved when the board was evaluated for fire resistance and hose stream resistance according to ASTM E-119. It is noted that the board has excellent water-resistant properties due to the use of water-resistant additives in its core, those additives being wax-asphalt emulsion and poly(vinyl alcohol).

The aforementioned examples well illustrate the excellent fire-resistant characteristics possessed by the development of the present invention. In the examples and other portions of the description of the invention, reference has been made specifically to a shaft wall assembly including metal framework of particular design. It should be understood that fibrous mat-faced gypsum board as described herein can be used in other types of shaft wall assemblies, including assemblies made from other types of fire-resistant materials, for example, fire-resistant plastics. It is noted also that the compositions of the examples included the use of calcium sulfate hemihydrate to form the set gypsum product. Alternatively, there can be used calcium sulfate, the term used in the claims to cover generically both calcium sulfate and calcium sulfate hemihydrate.

In summary, it can be said that the present invention provides in a practical way important functional improvements in structural assemblies which are intended to have fire-resistant properties designed to ensure the safety of life and property.

We claim:

1. A glass mat-faced gypsum board comprising a set core containing gypsum dihydrate and at least about 0.03 wt. % chopped glass fibers, at least about 0.05 wt. % water-resistant additive, and paper fibers, whereby the board in ⅝ inch thickness achieves at least a one hour fire rating in accordance with ASTM E-119.

2. The gypsum board of claim 1 having a density of less than about 47 lbs./ft.³.

3. The gypsum board of claim 1, wherein said glass mat comprises a plurality of interstices which are free of set gypsum.

* * * * *

UNITED STATES PATENT AND TRADEMARK OFFICE
CERTIFICATE OF CORRECTION

PATENT NO. : 5,148,645

DATED : September 22, 1992

INVENTOR(S) : Charles W. Lehnert, Brian G. Randall, George F. Fowler, Jr., Ray W. Hinkel It is certified that error appears in the above-identified patent and that said Letters Patent is hereby corrected as shown below:

Col. 1, lines 15 through 19, after "U.S. Pat. No. 4,647,496)" insert a period and delete the remaining lines of the paragraph Col. 7, line 61, after "is" and before "carried" delete the comma Col. 9, line 36, after "for" and before "gypsum" insert --producing--

Col. 9, line 54, after "surface" and before "underlying" insert --of the--

Col. 16, line 29, after "generally" and before "have" delete the comma

Col. 20, line 53 (table), move the number "56" to line 54, across from "poly (vinyl alcohol)"

Col. 24, line 42 (table), move the number "0.44" down one line, across from "chopped glass fiber roving"

Col. 27, line 34, change "3/8"" to --5/8"--

Signed and Sealed this

Seventh Day of December, 1993

Attest:

BRUCE LEHMAN

*Attesting Officer*  *Commissioner of Patents and Trademarks*